United States Patent [19]

Mochizuki et al.

[11] Patent Number: 5,138,338
[45] Date of Patent: Aug. 11, 1992

[54] EDGE EMISSION TYPE ELECTROLUMINESCENT (EL) PRINTER

[75] Inventors: Masaru Mochizuki; Toshiyuki Tamura; Kaname Iga, all of Shizuoka, Japan

[73] Assignee: Tokyo Electric Co., Ltd., Tokyo, Japan

[21] Appl. No.: 565,338

[22] Filed: Aug. 10, 1990

[30] Foreign Application Priority Data

Aug. 14, 1989 [JP] Japan .................................. 1-209867

[51] Int. Cl.$^5$ ........................ B41J 2/435; G03G 15/04
[52] U.S. Cl. .............................. 346/107 R; 346/153.1; 315/169.3; 340/781
[58] Field of Search ................ 346/107 R, 160, 153.1; 315/169.3; 340/781, 805, 825.81

[56] References Cited

U.S. PATENT DOCUMENTS

| | | | |
|---|---|---|---|
| 4,823,121 | 4/1989 | Sakamoto et al. | 315/169.3 X |
| 4,899,184 | 2/1990 | Leksell et al. | 346/160 X |
| 4,951,064 | 8/1990 | Kan et al. | 346/107 R |

FOREIGN PATENT DOCUMENTS

| | | |
|---|---|---|
| 54-130893 | 10/1979 | Japan ................................... 340/781 |
| 60-134660 | 7/1985 | Japan . |
| 60-135279 | 7/1985 | Japan . |
| 62-116170 | 5/1987 | Japan . |
| 1-85846[U] | 6/1989 | Japan . |

*Primary Examiner*—Joan H. Pendegrass
*Attorney, Agent, or Firm*—Oblon, Spivak, McClelland, Maier & Neustadt

[57] ABSTRACT

An edge emission type EL printer having a line head constituted by an array of numerous edge emission type EL devices. One group of electrodes for the EL devices receive driving pulses from a first driver means, and the other group thereof get driving pulses from a second driver means as per emission control signals. This allows the EL devices to selectively luminesce, forming an electrostatic latent image on the circumference surface of a photosensitive body charged by a charger. The image is developed by a developer and transferred to a recording medium by a transfer machine. The emission control signals entering the line head are monitored so that when the absence of EL devices luminescing within one primary scanning line is detected from the monitoring, a driving pulse stopping means is activated to stop accordingly the driving pulses continuously applied to the EL devices by the first driver means.

2 Claims, 7 Drawing Sheets

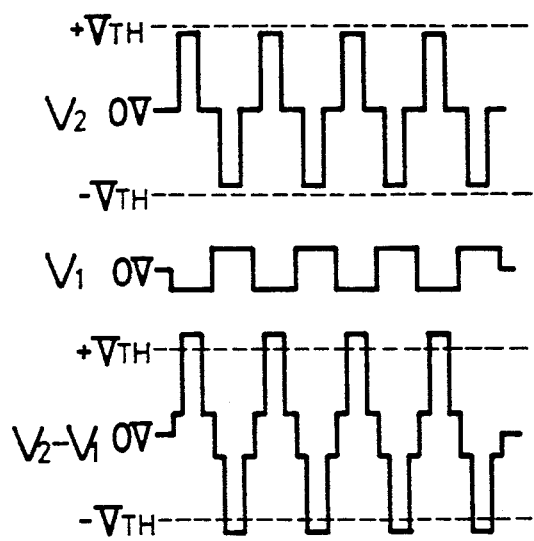
FIG. 4 (a)
PRINTING IN PROGRESS
(EMISSION)
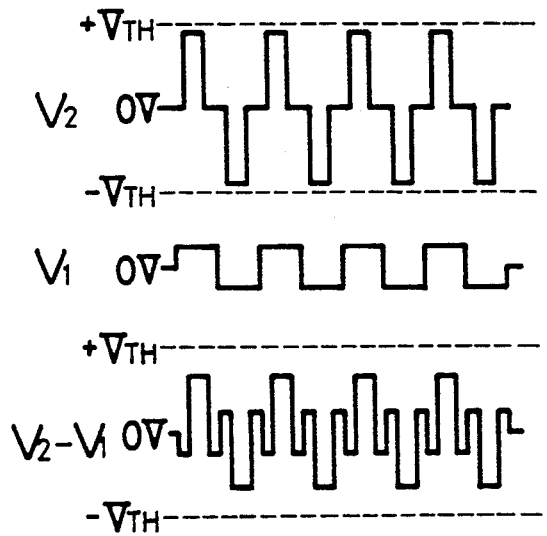
FIG. 4(b)
PRINTING STOPPED
(NONEMISSION)
FIG. 5
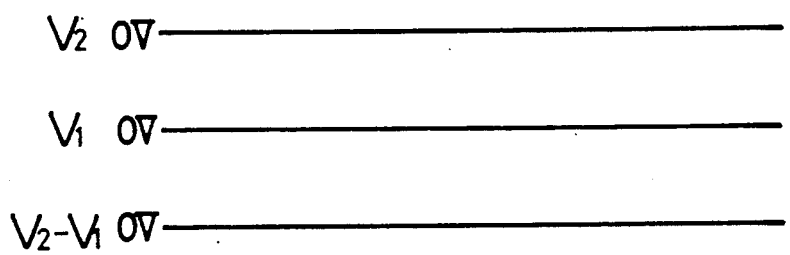

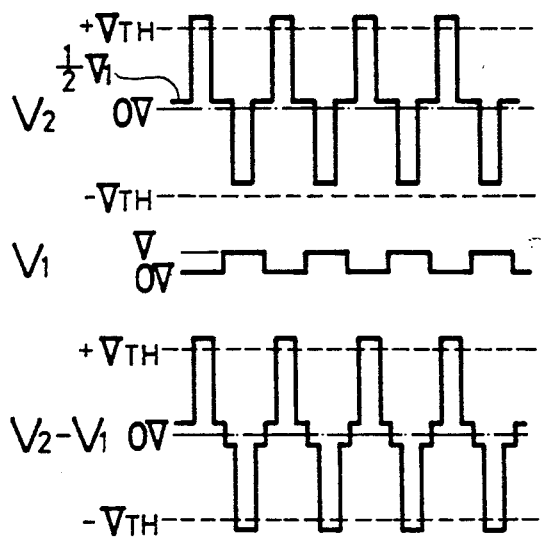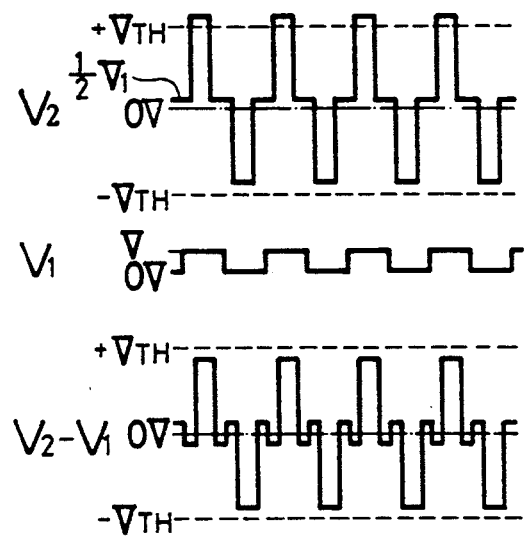
FIG.6(a) PRINTING IN PROGRESS (EMISSION)
FIG.6(b) PRINTING STOPPED (NONEMISSION)
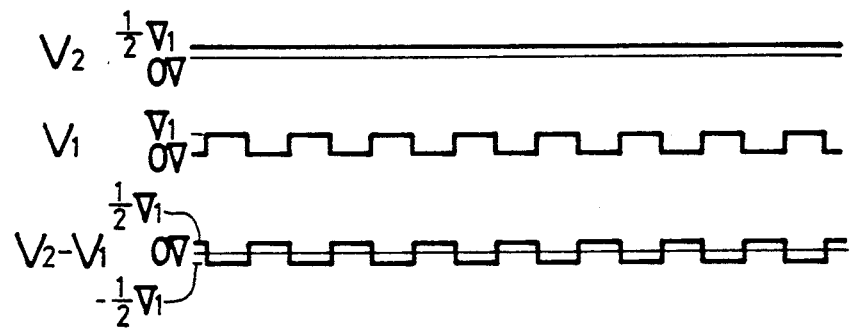
FIG.7

EDGE EMISSION TYPE ELECTROLUMINESCENT (EL) PRINTER

FIELD OF THE INVENTION AND RELATED ART STATEMENT

The present invention relates to a line printer operating on the principle of electrophotography and, more particularly, to an edge emission type electroluminescent (EL) printer having a line head constituted by an array of edge emission type EL devices.

One of the prior art printers operating on the electrophotographic principle is what is known as the line printer typically constructed as shown in FIG. 8. In this printer, a photosensitive drum 50 which is a photosensitive body is surrounded by a charger 51, a line head 52, a developer 53 and a transfer machine 54, all installed close to the circumference surface of the drum. The charger 51 charges the circumference surface of the photosensitive drum 50 with a voltage. The line head 52 with its array of light-emitting devices, not shown, scans the charged circumference surface using selective light emissions from the devices to form an electrostatic latent image on the surface. The latent image is developed with a developing solution such as a toner supplied by the developer 53. The toner-developed image is transferred by the transfer machine 54 to a recording medium 55. The residual toner following the image transfer is removed by a cleaner 56. The charged photosensitive drum 50 is de-energized by a de-energizer 57 in preparation for another printing pass. The light-emission devices of the line head 52 are typically LEDs (light-emitting diodes). One disadvantage of the LEDs is the difficulty in acquiring both high degrees of uniformity in their light emissions and high levels of their yield at the same time.

An improvement to the above prior art is the use of what is known as the edge emission type electroluminescent (EL) device in the line head. Below is a brief description of a prior art line head incorporating such edge emission type EL devices with reference to FIGS. 9 and 10. As shown in FIG. 10, an edge emission type EL device 2 has a thin film active layer 3 that contains zinc sulfide and some active elements sandwiched from above and below with dielectric layers 4 and 5, respectively. The layers 4 and 5 are in turn covered from above and below with flat electrodes 6 and 7, respectively. A flatly polarized beam of light is emitted from an edge of the active layer 3. This EL device is about 100 times as intense in emission as the comparable class of prior art EL devices that emit light from their top, not from their edge. As depicted in FIG. 9, a plurality of edge emission type EL devices 2 of the above-described construction are positioned side by side to form a rod lens array, not shown, using thin film technology, whereby a line head 8 is constituted.

This applicant proposed an edge emission type EL printer having the line head 8 comprising a plurality of edge emission type EL devices 2, wherein "m" common electrodes are wired to "n" block electrodes to form a matrix wiring pattern. That is, as shown in FIG. 11, four EL devices 2 constitute a single electrode block, and four common electrodes $9_1$ through $9_4$ are wired to "n" block electrodes $10_1$ through $10_n$ to make up the matrix.

The edge emission type EL printer of the above-described construction causes the edge emission type EL devices 2 of the line head 8 to selectively luminesce in order to produce an electrostatic latent image on the photosensitive drum 50 for printing by electrophotography. In operation, high voltage pulses are applied to four common electrodes $9_1$ through $9_4$, and low voltage pulses to "n" block $10_1$ through $10_n$. The high and low voltage pulses are suitably synchronized in performing primary scanning over the drum. More specifically, high voltage pulses are applied consecutively to the common electrodes $9_1$ through $9_4$ as per the high voltage pulse timing chart of FIG. 12. In synchronization with the high voltage pulses, low voltage pulses are selectively applied to appropriate block electrodes 10 so that the desired edge emission type EL devices 2 luminesce selectively. With this edge emission type EL printer, if the scanning time required for each of the common electrodes $9_1$ through $9_4$ is $T_1$, one primary scanning line is formed within the time period of $$T_0 = T_1 \times 4$$

FIG. 13 depicts a print image illustratively formed when all continuous high voltage pulses for the common electrodes 9 are synchronized with the low voltage pulses for the block electrodes 10. Dots in each line are not aligned because the line head 8 undergoes secondary scanning as the photosensitive drum 50 rotates.

In FIG. 12, four high voltage pulses are applied to a single common electrode 9 during the scanning time $T_1$. This is because one pulse is not enough to make the edge emission type EL device 2 luminesce. Four low voltage pulses are applied to a given block electrode 10 in synchronization with these four high voltage pulses so that the applicable edge emission type EL device 2 will generate an enhanced level of luminance.

Given this matrix wiring, the overhead on the ICs of driving circuits, not shown, is alleviated. The reason for this is that in the low voltage pulses that are applied to the block electrodes 10 required to be driven selectively by the driving circuits.

One disadvantage of the above prior art control method is that because the high voltage pulses are always applied even to those edge emission type EL devices 2 which do not luminesce, unnecessary power dissipation results. Another disadvantage is that because of its characteristics, the edge emission type EL device 2 develops ongoing deterioration in its thin film structure when subjected to continuous pulse application with or without generating luminescence, thereby gradually lowering the level of its emission output. In the construction where pulses keep coming into all edge emission type EL devices 2 regardless of their individual operating status, the secular change of the line head 8 is pronounced, and the durability of the edge emission type EL printer 1 suffers correpondingly.

OBJECT AND SUMMARY OF THE INVENTION

It is therefore an object of the present invention to provide an edge emission type EL printer which consumes less power than the prior art edge emission type EL printer of the comparable class.

It is another object of the present invention to provide an edge emission type EL printer whose line head suffers less secular change than that of the prior art edge emission type EL printer of the comparable class.

In achieving the forgoing and other objects of the present invention and according to one aspect thereof, there is provided an edge emission type EL printer comprising a line head having an array of numerous edge emission type EL devices; a first driver means which continuously applies driving pulses to one group of the electrodes of the edge emission type EL devices; a second driver means which drives the other group of the electrodes of the edge emission type EL devices; a driving pulse stopping means which monitors an emission control signal entering the line head so that if there is no edge emission type EL device to luminesce within a primary scanning line, the stopping means stops the driving pulses continuously applied to the applicable EL devices by the first driver means; and a photosensitive body surrounded by a charger, the line head, a developer, a transfer machine, a cleaner and a de-energizer installed close to the circumference thereof. Because the driving pulse stopping means stops the application of driving pulses to those edge emission type EL devices that do not luminesce within a line, the printer saves power during operation. In addition, the deterioration of the thin film structure in the edge emission type EL devices is reduced so that the decrease in their emission output over time is minimized.

BRIEF DESCRIPTION OF THE DRAWINGS

FIG. 4($a$) and 4($b$) is a set of timing charts depicting high and low voltage pulses being applied in two different states;

FIG. 5 is a timing chart showing the high and low voltage pulses as they appear when when the driving pulses stopping means is activated;

FIG. 6($a$) and 6($b$) is a set of timing charts showing a variation of the high and low voltage pulses being applied;

FIG. 7 is a timing chart depicting the variation of the high and low voltage pulses as they appear when the driving pulse stopping means is activated;

DESCRIPTION OF PREFERRED EMBODIMENT

Figure 8:
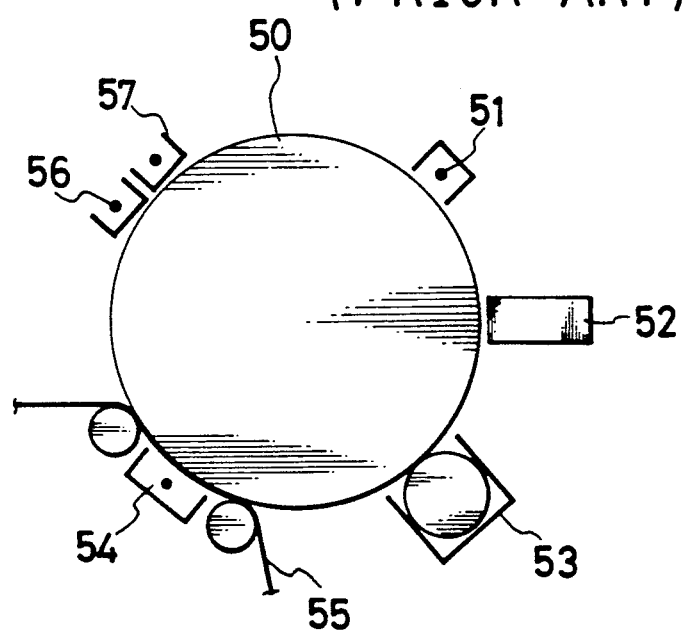
FIG. 8 is a side view of a typical prior art line printer.
Figure 9:
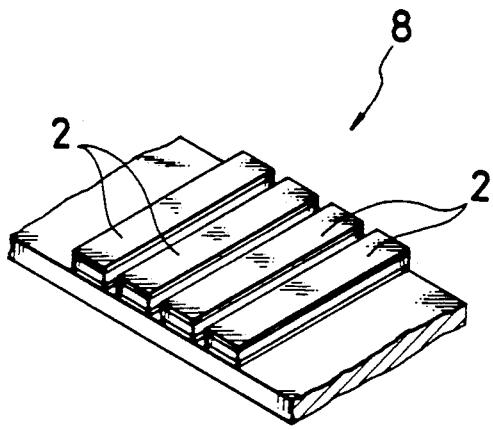
FIG. 9 is a perspective view of a typical prior art line head incorporating edge emission type EL devices.
Figure 10:
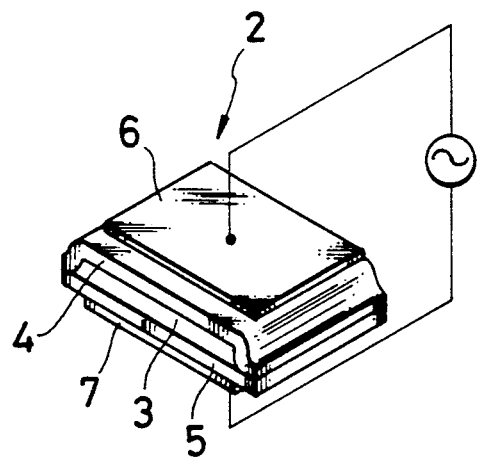
FIG. 10 is a perspective view of a prior art edge emission type EL device used in the prior art line head.
Figure 11:
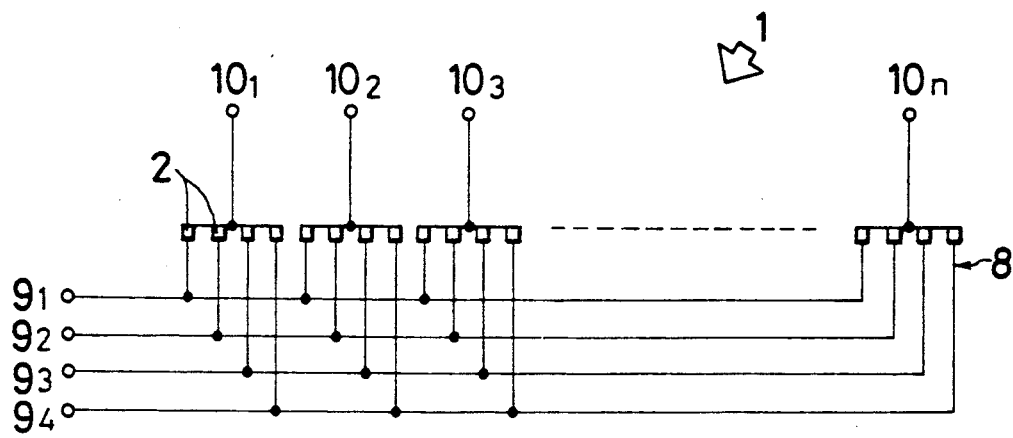
FIG. 11 is a view illustrating how the line head is wired.

The preferred embodiment of the present invention will now be described with reference to FIGS. 1 through 5. An edge emission type EL printer 11, which is the embodiment of the invention, is identical in some structural aspects to the prior art printer illustrated in FIGS. 8 through 10. The basic construction of the prior art printer is shown in FIG. 8 and the optical components thereof are depicted in FIGS. 9 and 10. Thus those parts of the embodiment which are identical in construction to their counterparts in the prior art printer are designated by the same reference characters in FIGS. 8 through 10, and any respective description thereof will be omitted.

Figure 1:
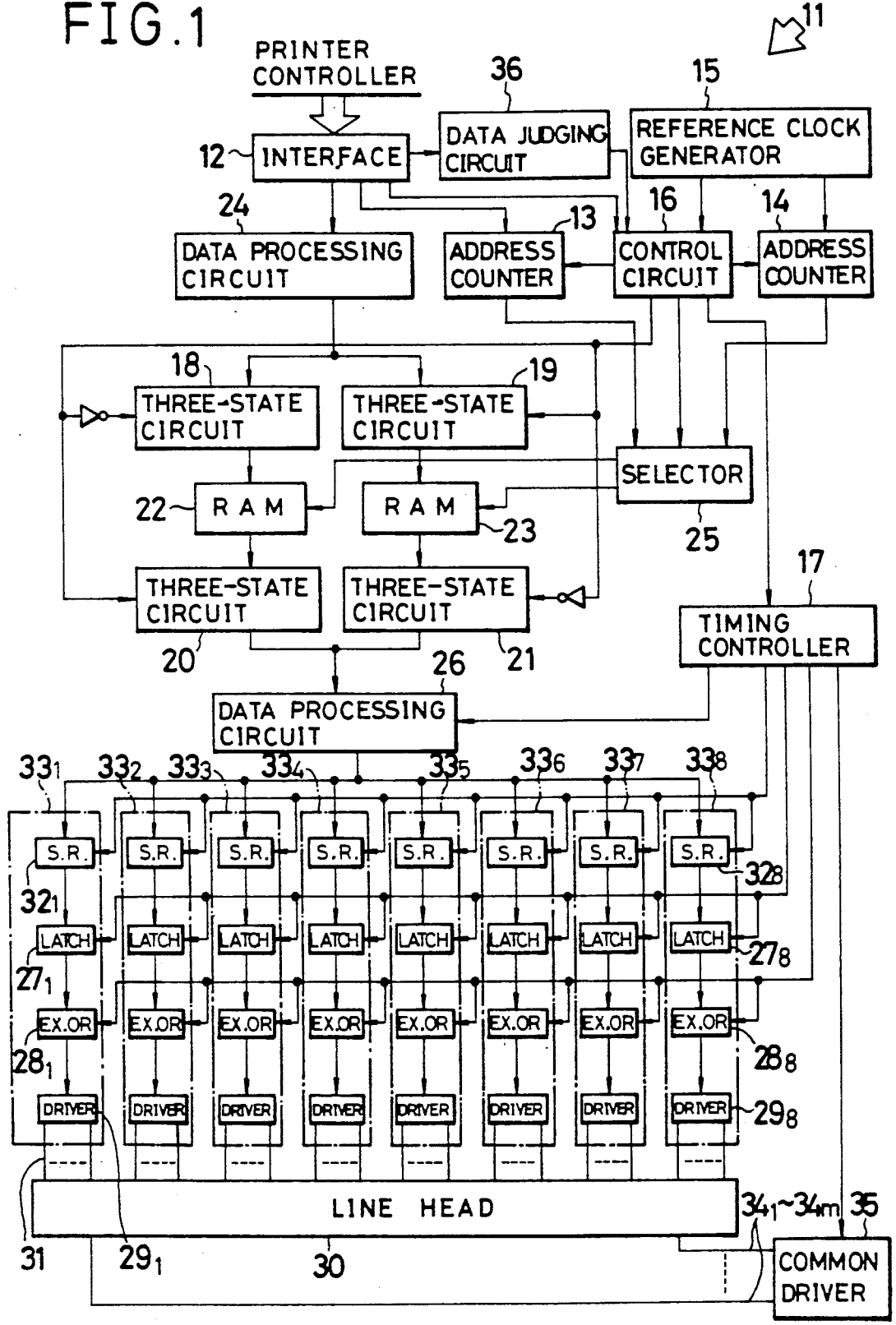
FIG. 1 is a block diagram of electrical parts constituting the line head for use in the edge emission type EL printer which is a preferred embodiment of the present invention.

Referring now to FIG. 1, the driving circuitry of the edge emission type EL printer 11 will be described. A print signal is transmitted from a printer controller to an interface 12. The interface 12 is connected to a timing controller 17 via a control circuit 16 that serves as the driving pulse stopping means. The control circuit 16 is connected to two address counters 13 and 14 and a reference clock generator 15.

The interface 12 is connected, via a first data processing circuit 24, to two RAMs 22 and 23 which are line memories whose inputs and outputs are connected to three-state circuits 18 through 21. To the RAM 22 and 23 are connected the control circuit 16, which acts as a switching means, and the address counters 13 and 14 via a selector 25. The RAMs 22 and 23 are further connected, via the three-state circuits 20 and 21, to a second data processing circuit 26 to which the timing controller 17 is connected.

Block electrodes 31 of a line head 30 are connected in parallel to the second data processing circuit 26. Between the second data processing circuit 26 and the block electrodes 31, there are interposingly installed eight shift registers $32_1$ through $32_8$, eight latches $27_1$ through $27_8$, eight exclusive OR circuits $28_1$ through $28_8$, and eight second drivers $29_1$ through $29_8$. With this edge emission type EL printer 11, eight ICs $33_1$ through $33_8$ each accommodate eight circuits, one from each of the four groups of eight circuits 27, 28, 29 and 32.

The timing controller 17 is connected to the shift registers $32_1$ through $32_8$, to the latches $27_1$ through $27_8$ and to the exclusive OR circuits $28_1$ through $28_8$. The timing controller 17 is also connected to a common driver 35 which acts as a first driver and which is connected to common electrodes $34_1$ through $34_m$ of the line head 30.

Furthermore, a data judging circuit 36, a nonemission detecting means of the printer 11, is interposingly installed between the interface 12 and the control circuit 16.

The edge emission type EL printer 11 of the above-described construction admits through the interface 12 a print signal which is an emission control signal. The print signal is compressed per primary scanning line through rearrangement or other techniques by the first data processing circuit 24. Either the RAM 22 or the RAM 23 is selected to store the signal. That is, the print signal is stored temporarily in either the RAM 22 or the RAM 23 selected under timing control of the address counter 13. At this point, operating in synchronization with reference clock pulses for high-speed output from the reference clock generator 15, the controller circuit 16 and address counter 14 trigger a high-speed output from the other RAM of the print signal that was stored therein. In this manner, the duel RAM setup enhances the speed of signal processing. While a print signal is being output from one RAM (22 or 23), a compressed print signal is introduced into the other RAM.

The print signal output from either the RAM 22 or the RAM 23 is processed again by the second data processing circuit 26 into a format fit for printing. The signal thus processed is output in parallel to the ICs $33_1$ through $33_8$ to be retained therein. With the ICs $33_1$ through $33_8$ and the common driver 35 under control of the timing controller 17, the block electrodes 31 and the common electrodes $34_1$ through $34_m$ respectively output low and high voltage pulses to the line head 30. As shown in FIG. 4, amplitude-symmetrical (i.e., symmetrical around zero voltage level) low voltage pulses $V_1$ are applied to the block electrodes 31, and likewise amplitude-symmetrical high voltage pulses $V_2$ close to a threshold voltage $\pm V_{TH}$ of the edge emission type EL devices 2 are applied to the common electrodes 34. In this state, the difference between pulses $V_2 - V_1$ is applied to the edge emission type EL devices 2. In this way, controlling the synchronization of the two kinds of pulses controls emissions and nonemissions of the edge emission type EL devices 2.

Figure 2:
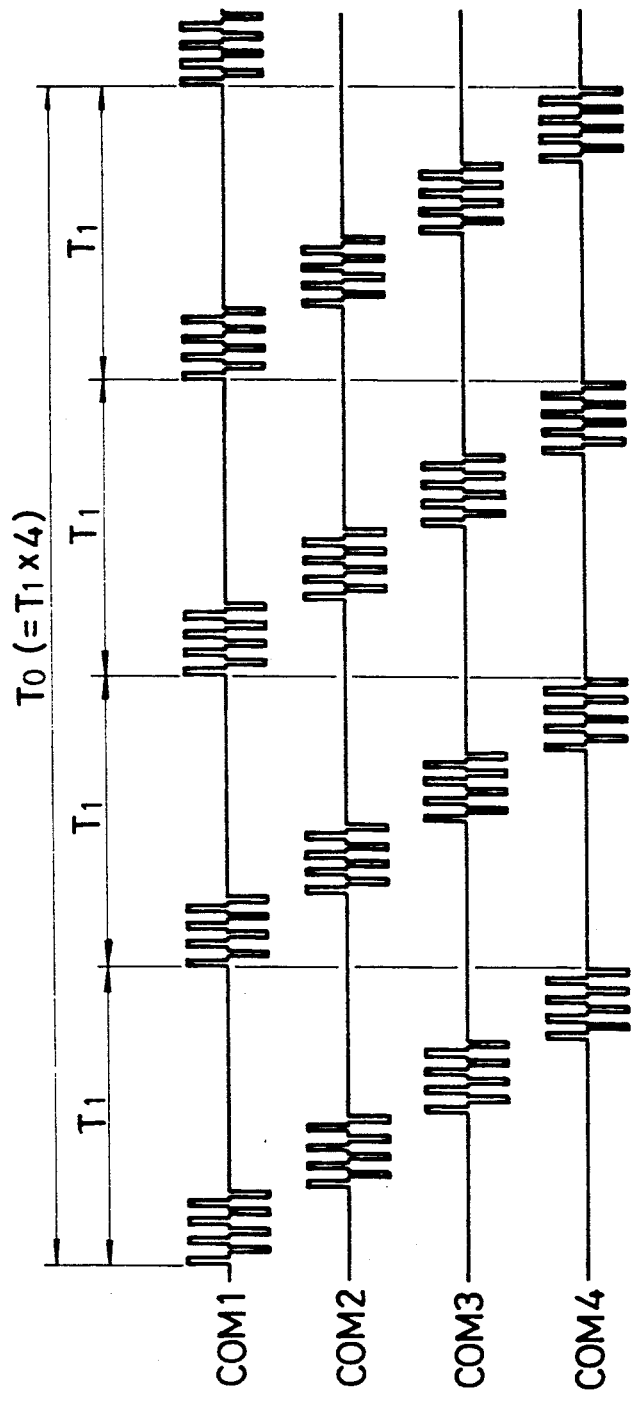
FIG. 2 is a timing chart showing high voltage pulses applied to common electrodes of the embodiment.
Figure 3:
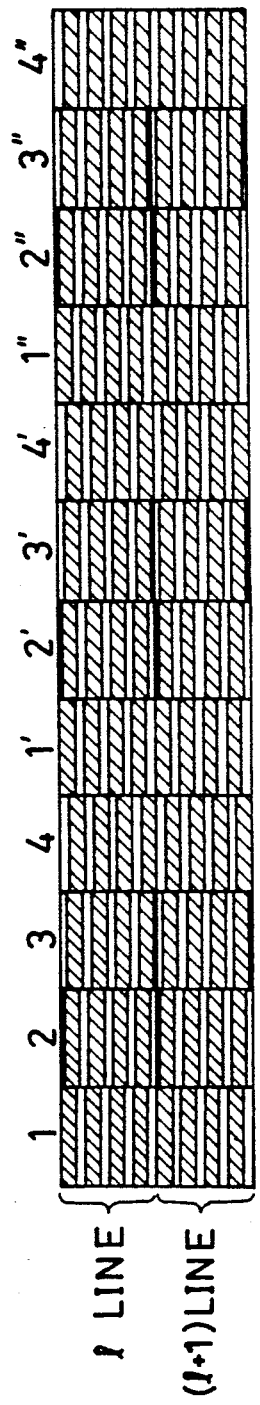
FIG. 3 is a view illustrating an image printed by the embodiment.
Figure 12:
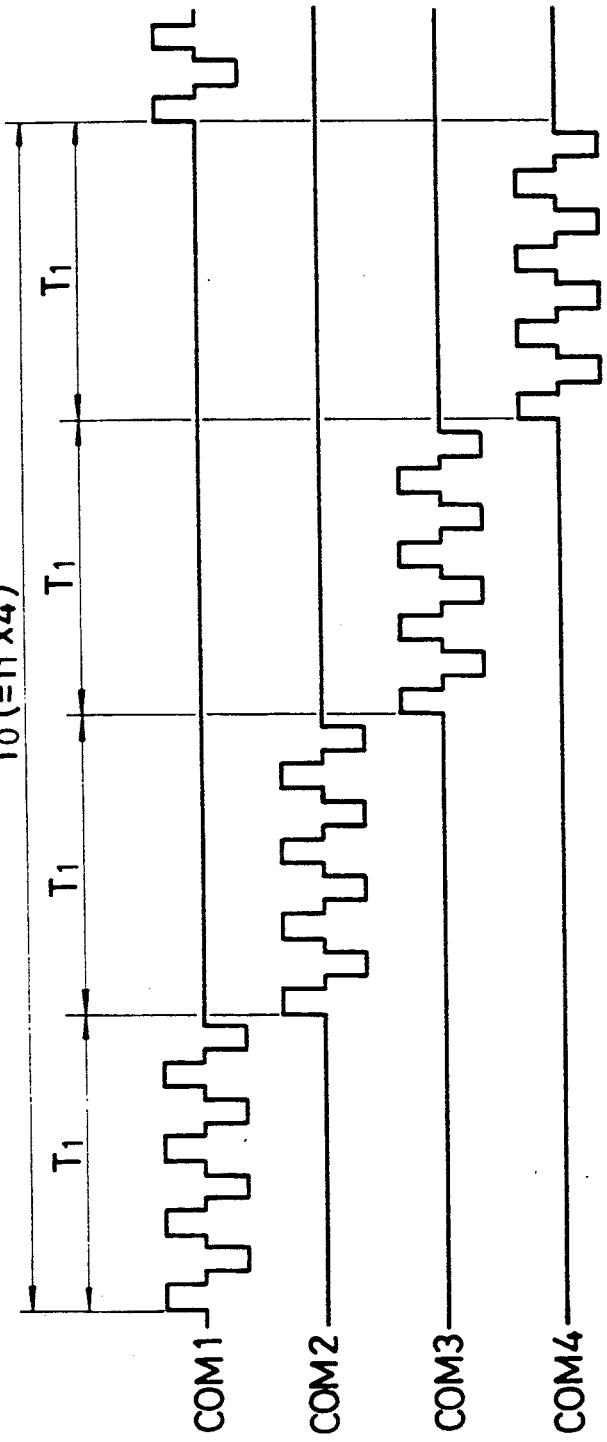
FIG. 12 is a timing chart of high voltage pulses applied to prior art common electrodes.
Figure 13:
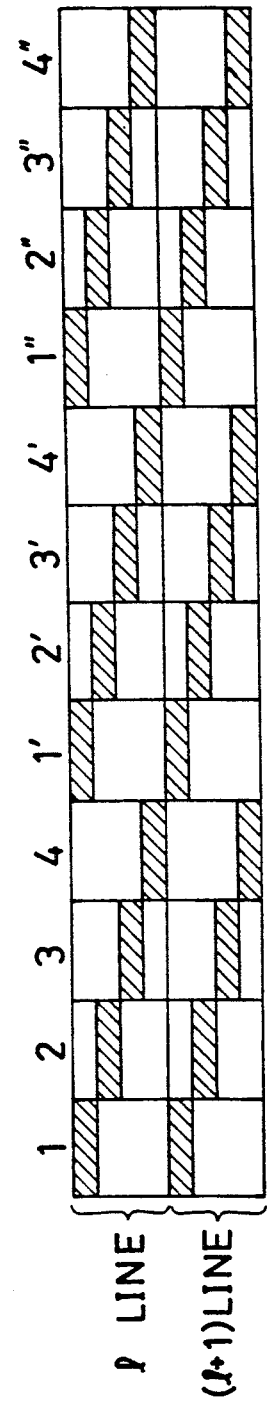
FIG. 13 is a view showing an image printed by the prior art edge emission type EL printer.

In the edge emission type EL printer 11, the above-described process is repeated four times during the printing time $T_0$, i.e., while one line is being printed, as per the timing chart of FIG. 2 indicating the high voltage pulses for the common electrodes 34. The line head 30 repeats its line emission four times in covering the width of one primary scanning line. The line thus printed (FIG. 3) has its serrated edge portions reduced to a quarter of those of the image illustrated in FIG. 13; the edges appear to be substantially flat. Because four light emissions constitute a single dot, there occur no recognizable spurious white spots in the secondary scanning direction. It is to be noted, however, that the prior art scheme shown in FIG. 12 is similar to this embodiment in that four pulses are applied to the edge emission type EL devices 2 to boost their luminance relative to one high voltage pulse given to the common electrodes 34 to produce a single dot. With this embodiment, four pulses are applied per high voltage pulse. Alternatively, the number of pulses per high voltage pulse may be more or less than four.

In the edge emission type EL printer 11, print signals entered via the interface 12 are kept monitored by the data judging circuit 36. If the data judging circuit 36 detects a print signal designating no EL device 2 luminescing within one primary scanning line, the circuit 36 accordingly stops all driving pulses that the control circuit 16 applies to the line head 30. That is, as shown in FIG. 5, zero-voltage driving pulses $V_1$ and $V_2$ are applied from the electrodes 31 and 34 to the line head 30. The edge emission type EL devices 2 all receive zero voltage, since $$V_2 - V_1 = 0$$

The power consumption of the printer as a whole is reduced for the time period in which the edge emission type EL devices 2 receive no voltage. With deterioration reduced in the thin film structure of the EL devices 2 thanks to their selective inactivity, the secular change-induced drop in the level of their emission output is minimized. Generally, the driving pulses applied to the common electrodes 34 are higher in voltage than those applied to the block electrodes 31 so as to prevent overloads of the ICs 33 in the driving circuitry. This means that stopping the driving pulses directed at the common electrodes 34 further enhances the benefit of power dissipation reductions for the printer.

In the edge emission type EL printer 11 of this embodiment, the driving pulses are stopped under control when all edge emission type EL devices 2 do not luminesce while one primary scanning line is being formed. An alternative is to monitor print signals for each of the common electrodes $34_1$ through $34_m$ to detect those common electrodes for which no EL devices 2 luminesce within a single primary scanning line, and to stop the driving pulses directed to the detected common electrodes 34. This variation involves less power consumption than the original scheme of the embodiment in which the driving pulses are controlled per primary scanning line. This is because the driving pulses are more often stopped in the variation than in the original scheme. In addition, the prevention of the deterioration in the edge emission type EL devices 2 is more pronounced with the variation.

In the preferred embodiment, the data judging circuit 36 checks to see if there are any edge emission type EL devices 2 not luminescing while a primary scanning line is being formed. In practice, another approach may be alternatively adopted in which the control circuit 16, which is the driving pulse stopping means, stops all driving pulses to the line head 30 when no EL devices 2 luminesce within a single primary scanning line.

In the preferred embodiment, amplitude-symmetrical pulses are utilized (FIG. 4) to drive the edge emission type EL printer 11. But the circuits that output such pulses tend to burden their IC arrangement significantly. An alternative to this is a circuit-simplifying approach in which, as shown in FIG. 6, positive low voltage pulses $V_1$, i.e., pulses that stay above the zero voltage level, are applied to the block electrodes 31, while corresponding high voltage pulses $V_2$ that are asymmetrical in amplitude (i.e., around zero voltage level) are applied to the common electrodes 34. With such an edge emission type EL printer, not shown, which is driven by asymmetrical pulses, there may be a variation in which the driving pulses to the common electrodes 34 are selectively stopped. With this variation, as shown in FIG. 7, half of the voltage applied to the block electrodes 31 is applied to the common electrodes 34. This means that all edge emission type EL devices 2 in the line head 30 receive amplitude-symmetrical constant voltage pulses given as:

$$V_2 - V_1 = \tfrac{1}{2} V_1$$

Because of their characteristics, the EL devices 2 develop less deterioration given the above kind of pulses than if given the asymmetrical pulses $V_1$.

It is to be understood that while the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. An edge emission type electroluminescent (EL) printer comprising:
   a photosensitive body;
   a charger for charging the circumference surface of said photosensitive body with electricity;
   a line head constituted by an array of a large number of edge emission type EL devices that selectively luminesce so as to form an electrostatic latent image on that circumference surface of said photosensitive body which is charged by said charger;
   a first driver means for continuously applying driving pulses to one group of the electrodes for said edge emission type EL device and for generating high voltage pulses that are asymmetrical in amplitude with reference to a zero level to a common electrode;

a second driver means for selectively applying driving pulses to the other group of the electrodes for said edge emission type EL devices in accordance with an emission control signal;

a driving pulse stopping means which monitors said emission control signal entered into said line head and which, if said signal indicates the absence of any said EL devices luminescing during the formation of one primary scanning line, stops said driving pulses that were continuously applied to said EL devices by said first driver means;

a developer for developing said electrostatic latent image formed by said line head on said photosensitive body by application of a developing solution to said image;

a transfer machine for transferring to a recording medium said electrostatic latent image developed by said developer on said photosensitive body;

a cleaner for removing the residual portion of said developing solution from said photosensitive body; and a de-energizer for de-energizing the charged state of said photosensitive body.

2. An edge emission type EL printer according to claim 1, wherein $m \times n$ edge emission type EL devices are wired by m common electrodes and n block electrodes into a matrix pattern, said common electrodes and said block electrodes receiving driving pulses from said first driver means from said second driver means, respectively.

* * * * *